(12) United States Patent
Young et al.

(10) Patent No.: US 8,578,354 B2
(45) Date of Patent: Nov. 5, 2013

(54) LINK-TIME RESOURCE ALLOCATION FOR A MULTI-THREADED PROCESSOR ARCHITECTURE

(75) Inventors: Martin Young, South Gloucestershire (GB); Richard Osborne, Bristol (GB); Douglas Watt, Bristol (GB)

(73) Assignee: Xmos Limited, Bristol (GB)

( * ) Notice: Subject to any disclaimer, the term of this patent is extended or adjusted under 35 U.S.C. 154(b) by 254 days.

(21) Appl. No.: 12/992,178

(22) PCT Filed: May 11, 2009

(86) PCT No.: PCT/EP2009/055674
§ 371 (c)(1),
(2), (4) Date: Feb. 7, 2011

(87) PCT Pub. No.: WO2009/138381
PCT Pub. Date: Nov. 19, 2009

(65) Prior Publication Data
US 2011/0131558 A1 Jun. 2, 2011

(30) Foreign Application Priority Data
May 12, 2008 (GB) .................................. 0808576.3

(51) Int. Cl.
*G06F 9/45* (2006.01)
(52) U.S. Cl.
USPC ............ 717/145; 717/119; 717/149; 717/162
(58) Field of Classification Search
None
See application file for complete search history.

(56) References Cited

U.S. PATENT DOCUMENTS

| 5,778,212 | A | * | 7/1998 | Dehnert et al. | 717/155 |
| 5,953,530 | A | * | 9/1999 | Rishi et al. | 717/127 |
| 2002/0147855 | A1 | * | 10/2002 | Lu | 709/310 |
| 2005/0071841 | A1 | * | 3/2005 | Hoflehner et al. | 718/100 |
| 2005/0138442 | A1 | * | 6/2005 | Keller et al. | 713/300 |
| 2005/0188362 | A1 | | 8/2005 | Metzger et al. | |
| 2006/0095901 | A1 | * | 5/2006 | Brokenshire et al. | 717/151 |
| 2006/0150165 | A1 | * | 7/2006 | Hooper et al. | 717/140 |
| 2007/0150895 | A1 | * | 6/2007 | Kurland | 718/102 |

(Continued)

FOREIGN PATENT DOCUMENTS

| EP | 1 085 410 A2 | 3/2001 |
| WO | 99/61970 A | 12/1999 |

OTHER PUBLICATIONS

Bob Beck et al., "A Parallel-Programming Process Model", IEEE Software, IEEE Service Center, May 1989, pp. 63-72, vol. 6, No. 3.

(Continued)

*Primary Examiner* — Don Wong
*Assistant Examiner* — Daxin Wu
(74) *Attorney, Agent, or Firm* — Sughrue Mion, PLLC

(57) ABSTRACT

A method comprising: independently compiling a plurality of modules of source code to generate a plurality of respective object modules comprising a plurality of respective parallel threads explicitly designated by a user to be executed in parallel on a target platform; in each of the object modules, inserting at least one symbol indicative of a usage of a resource of the target platform associated with the respective thread; executing a linker to perform a linking process for linking the object modules, wherein the linking process comprises assessing the symbols in conjunction with one another, and based on the assessment generating an indication relating to a usage of the resource required for execution of the threads in parallel.

48 Claims, 5 Drawing Sheets

(56) References Cited

U.S. PATENT DOCUMENTS

| | | | |
|---|---|---|---|
| 2008/0022265 A1* | 1/2008 | Morris | 717/140 |
| 2008/0114937 A1* | 5/2008 | Reid et al. | 711/117 |
| 2008/0209140 A1* | 8/2008 | Roth | 711/154 |
| 2009/0013397 A1* | 1/2009 | May | 726/9 |
| 2009/0100432 A1* | 4/2009 | Holloway et al. | 718/103 |

OTHER PUBLICATIONS

Wei Hu et al., "Adjust ELF Format for Multi-core Architecture", IEEE, 2009, pp. 388-391, International Conference on Electronic Computer Technology.

* cited by examiner

LINK-TIME RESOURCE ALLOCATION FOR A MULTI-THREADED PROCESSOR ARCHITECTURE

CROSS REFERENCE TO RELATED APPLICATIONS

This application is a National Stage of International Application No. PCT/EP2009/055674 filed on May 11, 2009, which claims priority from United Kingdom Patent Application No. 0808576.3, filed on May 12, 2008, the contents of all of which are incorporated herein by reference in their entirety.

FIELD OF THE INVENTION

The present invention relates to a method and computer implemented tool-chain for compiling and linking modules of source code to generate a computer program, and also to an individual linker and individual compiler.

BACKGROUND

To generate a program, a software developer uses a tool-chain comprising a computer program or set of programs, which typically include at least a compiler for compiling object modules from source code and a linker for linking together a plurality of object modules to generate a resulting computer program, usually an executable file. However, a programmer must take careful steps when writing the source code regarding the use of resources by the resulting program.

SUMMARY

According to one aspect of the present invention, there is provided a method comprising: independently compiling a plurality of modules of source code to generate a plurality of respective object modules comprising a plurality of respective parallel threads explicitly designated by a user to be executed in parallel on a target platform; in each of the object modules, inserting at least one symbol indicative of a usage of a resource of the target platform associated with the respective thread; executing a linker to perform a linking process for linking the object modules, wherein the linking process comprises assessing the symbols in conjunction with one another, and based on the assessment generating an indication relating to a usage of the resource required for execution of said threads in parallel.

Thus the present invention advantageously allows the profiling of resources required by threads to be deferred to link-time. The overall resource requirement cannot be determined by the compiler where the threads result from procedures of different source code modules, because the compiler only sees each module individually and so has no visibility of the overall requirement According to another aspect of the present invention, there is provided a tool-chain comprising: first code for individually compiling and assembling a plurality of modules of source code, wherein the first code comprises code which when executed on a computer will generate a plurality of respective object modules comprising a plurality of respective threads, and insert in each of the object modules at least one symbol indicative of a usage of a resource of the target platform associated with the respective thread, the threads being explicitly designated by a user to be executed in parallel on a target platform; second code for linking the object modules, the second code comprising code which when executed on a computer will assess the symbols in conjunction with one another, and based on the assessment generate an indication relating to a usage of the resource required by execution of said threads in parallel.

According to another aspect of the present invention, there is provided a compiler and assembler product for individually compiling and assembling a plurality of modules of source code, wherein the product comprises code which when executed on a computer performs the steps of: generating a plurality of respective object modules comprising a plurality of respective threads explicitly designated by a user to be executed in parallel on a target platform; and in the compilation of each object modules, inserting at least one symbol for use by a linker indicative of a usage of a resource of the target platform associated with the respective thread.

According to another aspect of the present invention, there is provided a linker for linking a plurality of object modules comprising a plurality of respective threads explicitly designated by a user to be executed in parallel, each object module comprising at least one symbol indicative of a usage of a resource of the target platform associated with the respective thread, wherein the linker comprises code which when executed on a computer performs the steps of: assessing the symbols in conjunction with one another, and based on the assessment generating an indication relating to a usage of the resource required by execution of said threads in parallel; and linking the object modules to generate a computer program in which said threads are to be executed in parallel.

BRIEF DESCRIPTION OF THE DRAWINGS

For a better understanding of the present invention and to show how it may be carried into effect, reference will now be made by way of example to the accompanying drawings in which.

DETAILED DESCRIPTION OF PREFERRED EMBODIMENTS

A program may consist of a number of source modules, each compiled into a separate object, all of which are given as input to a linker to generate a single executable.

Figure 1:
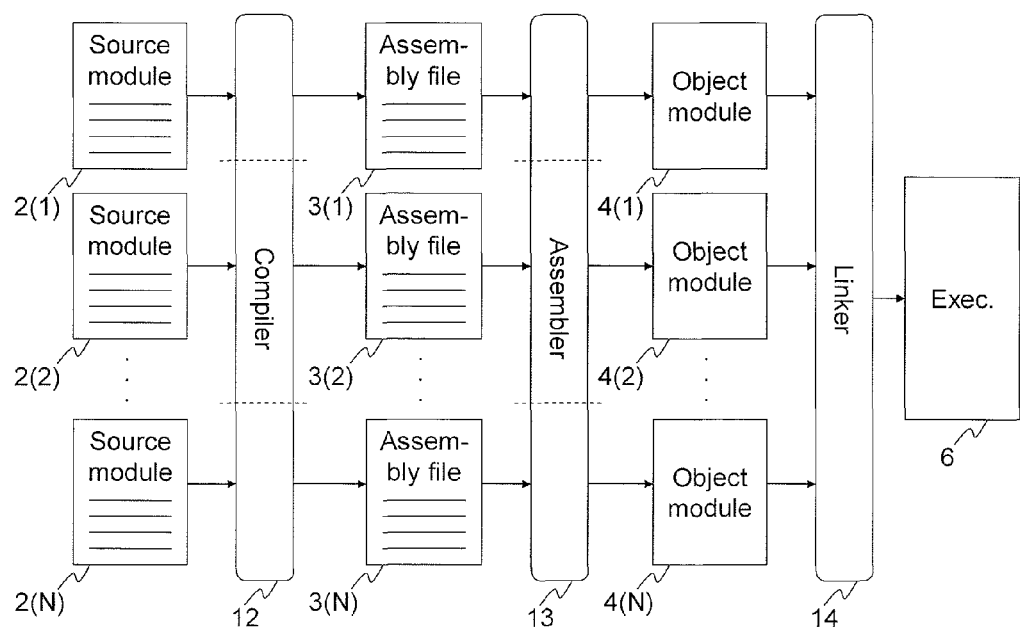
FIG. 1 is a schematic diagram of a tool-chain.

This process is illustrated schematically in FIG. 1. The program to be generated begins as a plurality of N source code modules 2(1) . . . 2(N) programmed in a high-level language, with N being anything from two upwards. These are input to a compiler 12, which compiles each of them separately to generate N corresponding assembly files 3(1) . . . 3(N) in assembly language. However, because the different modules will typically include elements which are not local to any single module, such as references to global variables or calls to procedures in other modules, then the compiler cannot necessarily fully compile the modules. The compiler therefore also emits directives into the assembly files 3. These are essentially instructions to the assembler 13 to add information into the corresponding object module 4 that it is assembling. This information may take the form of symbols and associated strings. Thus, when the assembly files 3(1) . . . 3(N) are subsequently input to the assembler 13, it generates N corresponding object modules 4(1) . . . 4(N) which each comprise machine code assembled from the assembly code plus additional information that the linker needs to safely link these objects with one another. When these object modules 4 are then input into the linker 14, it links these into a single executable file 6 using the symbol information where necessary.

Programming languages are conventionally described using a syntax grammar and a set of semantic rules that define which programs are valid and which are not. If different parts of a program are compiled at different times then the compiler does not have full visibility of all operations the programmer attempts to perform (for example, modifying an externally declared variable in one module that is defined as constant in another, or prototyping a procedure differently in different modules). Many existing compilers and linkers ignore these issues, resulting in undefined or at best implementation-defined semantics. This means the programmer has to take great care when structuring the source code as a collection of modules.

The inventors have recognised that certain kinds of conflict between modules can arise when generating multi-threaded programs. Multi-threading, or "parallelism", refers to a technique whereby an executable program is divided into two or more parallel program threads for concurrent execution. This parallel (i.e. concurrent) execution can be achieved by scheduling the threads in an interleaved manner, e.g. round robin, and/or by providing parallel execution units to execute two or more threads simultaneously. The multi-threading could be implemented purely in operating system software or could be implemented using some dedicated hardware such as dedicated registers for use by each of the threads.

Figure 2:
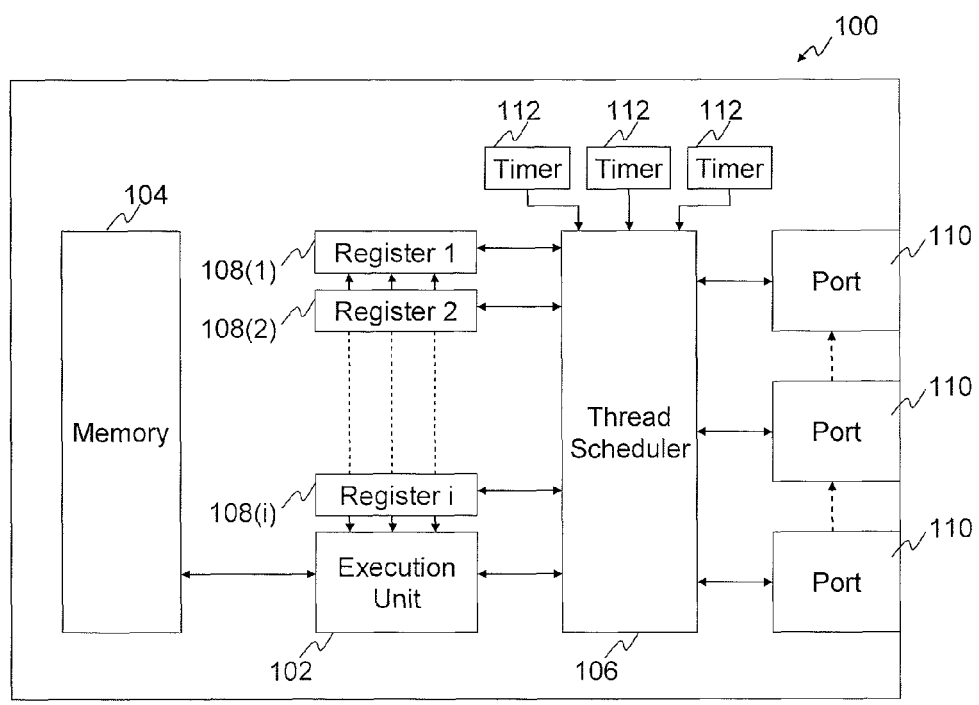
FIG. 2 is a schematic diagram of a multi-threaded processor architecture.

One example of a multi-threaded processor architecture according to a preferred application of the present invention is shown schematically in FIG. 2. The XCore, available from XMOS Ltd., has such an architecture. The processor 100 comprises an execution unit 102, a memory 104 coupled to the execution unit 102, and a thread scheduler 106 coupled to the execution unit 102. The processor also comprises a plurality of external ports 110, a plurality of timers 112, and a plurality i of sets of registers 108(1) . . . 108(i); each of the ports 110, timers 112 and register sets 108 being coupled to the thread scheduler 106. The thread scheduler 106 is a dedicated hardware unit for scheduling threads for execution by the execution unit 102. Each of the i register sets 108 is reserved for use by a respective one of up to i threads which can be executed in parallel.

In operation, the thread scheduler 106 maintains a set j of runnable threads from which it schedules instructions for execution in an interleaved, round-robin manner. Under control of the thread scheduler 106, the execution unit 102 fetches and executes the relevant instructions from memory 104. A thread can be associated by software with timers 112 and/or ports 110, and whether a thread is runnable can be tied to activity occurring at a timer 112 and/or port 110. For example, a thread can be set up to be suspended pending an input or output of data from a particular port 110, in which case the thread scheduler 106 suspends execution of the thread by removing it from the run set until the relevant port 110 provides a ready signal to the thread scheduler 106 indicating that the data is available for input or that the port is available for output. Alternatively, a thread can be set up to be suspended pending a particular time as measured by a particular timer, in which case the thread scheduler 106 suspends execution of the thread by removing it from the run set until the relevant timer 112 provides a ready signal to the thread scheduler 106 to indicate that the timer event has occurred.

In execution of each thread, the execution unit 102 and thread scheduler 106 make use of the respective set of registers 108 for that thread, in order to record information such as the program counter for the thread, operands of the thread, and status information such as whether or not the thread is to accept events from ports 110 and/or timers 112.

The processor 100 may also comprise one or more channel ends (not shown), which are hardware resources like ports, but for inputting and outputting data between the operand registers of the register sets 108 of different threads, allowing threads to communicate with one another. A channel is created by allocating a respective channel end to each of two threads and connecting them together (the allocation and connecting is controlled in software). Threads can then also be scheduled in dependence on activity such as the transfer of data over a channel, e.g. by the thread scheduler 106 suspending execution of a thread until data is received from another thread.

However, this is only one example of a potential target platform for which the present invention could be used to generate a computer program. In general, the present invention can be used to generate programs for any multi-threaded target.

As mentioned, a particular problem can occur when compiling and linking multi-threaded programs. This occurs where the parallelism is explicit in the language of the source code, i.e. where the programmer is able to specify in the source code procedures to be compiled and executed on different parallel threads. In this situation, the programmer may implement the parallel threads in different source code modules 2. However, the compiler 12 only has visibility of each module 2 in isolation and cannot therefore tell whether there is any conflict between the threads, which will only arise once the resulting object modules 4 have been linked and the target processor attempts to execute those threads in parallel. Without any safety features, the programmer must take great care to avoid this when writing the source code.

For example, consider the case where one thread from one module assigns a value to a global variable and another thread from another module also assigns a value to the same variable. When the two threads are executed in parallel the value of the global variable may be indeterminate. This is an example of a race condition: an error whereby a process is critically dependent on the sequence or timing of other events. Generally speaking, it is desirable to catch such conflicts at compile time, but in this case the compiler 12 will not see a conflict because it only compiles modules 2 independently.

In another example, a select statement in a module of source code 2 may consist of a set of guards ("case . . . ") and corresponding bodies. Only one of these guards is selected and then its corresponding body is executed. A guard may consist of an optional expression and an input, for example:

```
select {
    case f ( ) enables input(c1, &x) :
        respond(x);
    case input(c2, &x) :
        respond(x);
}
```

This select statement performs an input either on channel end c1 or c2 and responds to the inputted value. The other ends of these channels are used for output in different threads. However, the input on channel c1 is only considered if the procedure f returns true. In this case a conflict can occur if f causes a side effect (a side effect occurs where a module modifies some state of the program in addition to returning a value). If this were allowed, then it would be possible for one guard to have an effect even if its corresponding input and body were not executed (because f has to be called to evaluate the guard). This kind of conflict is difficult for the programmer to consider when writing the source code. If the procedure f is from a different source code module 2 than the select, then the compiler 12 cannot see the conflict either.

In another example, one thread from one module could require a certain amount of resources of the target processor, e.g. a certain number of timers 112, ports 110 or channel ends, or a certain amount of memory. One or more other threads from other modules could also require a certain amount of those resources. Although individually any given module 2 may respect the total available resources of the target, once the resulting object modules 4 have been linked then the corresponding threads may require in excess of the total available resources when an attempt is made to execute them in parallel. Additionally, if one or more threads require stack space then a decision may need to be made on how to partition a single memory resource between multiple threads.

Thus it can be seen that there is a class of problem that is particularly relevant where: (a) parallelism is explicit, so that the user can explicitly designate procedures from different modules as different threads; and (b) there is a potential conflict that may arise as a result of the parallel execution of those threads or a decision that must be made regarding the allocation of resources.

For targeting multi-threaded platforms, it would be desirable to allow the parallelism to be explicit in the high-level source language, while at the same time enabling different modules of programs written in such a language to be compiled separately and linked safely. The explicit parallelism could be implemented, for example, by extending the C language to include a statement "par {f, g}" to specify two (or more) procedures f and g as corresponding to two respective threads to be executed in parallel. To make this construct safe, it would be desirable to add some feature which, regardless of whether the program is compiled in one or more modules, would require for example all variable and procedure declarations to agree, prevent race conditions arising from two threads attempting to modify the same variable, disallow side effects, for example in guards of select statements, and/or disallow many other operations that would result in undefined behavior.

To enable parts of such a program to be compiled separately, the following embodiments of the present invention implement techniques which defer some of these checks until link time when all of the individually compiled objects are integrated and can be analyzed together. This is facilitated using an extensible format of object file to add sections for encoding high-level information into linkable objects. If the compiler is unable to guarantee that a semantic condition is met then it emits directives that instruct the assembler 13 to generate symbols that the linker 14 uses to evaluate the condition at link time, along with corresponding error strings that the compiler would have emitted had the semantic check in question have known to have failed. These directives refer to and define symbols in the object file's symbol table. If a directive references a symbol defined in another object and the other object is supplied to the linker then the directive is evaluated, otherwise evaluation of the directive is deferred until a subsequent link stage. Examples of extensible formats of object file include the Executable and Linker Format (ELF) and the Common Object File Format (COFF), but in general any object file format can be used if it allows the relevant information to be included.

Furthermore, similar techniques can be used to implement an efficient memory partitioning algorithm between threads that share a single memory, and to profile the upper bound on the maximum number of each type of resource (such as timers, channels, ports and threads) consumed by programs. Particularly, for example, if a processor has a small memory and a finite number of resources, this allows the linker to guarantee that a program will not fail at runtime due to a lack of available hardware resource, or warn that the program might fail.

Figure 3:
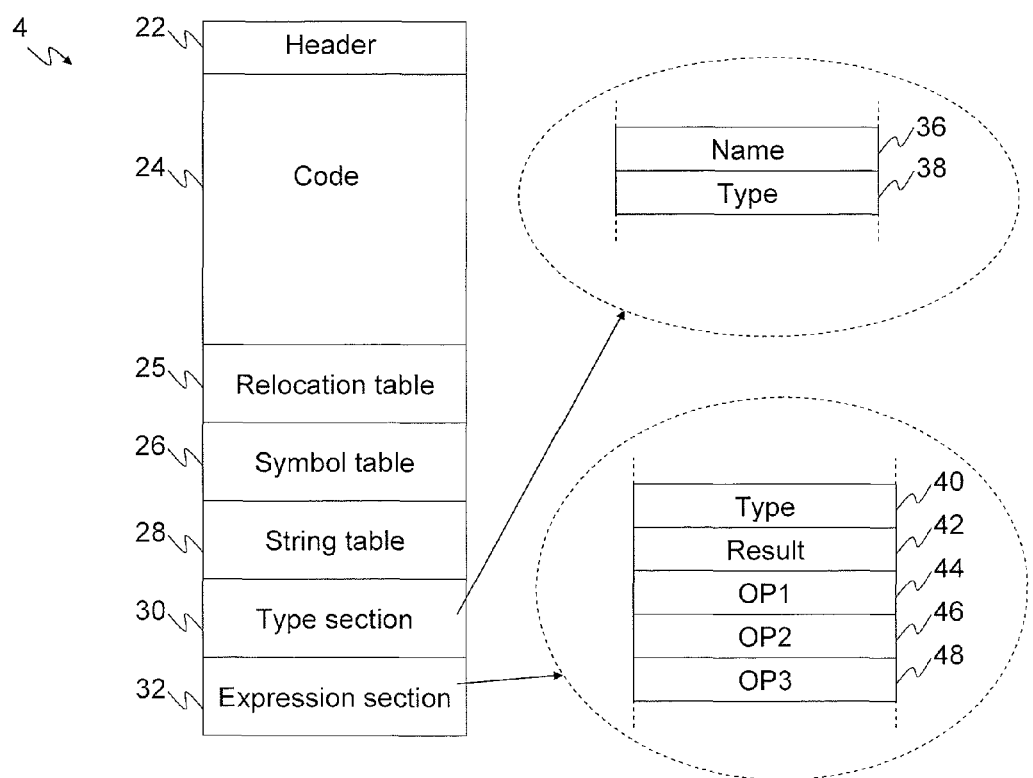
FIG. 3 is a schematic diagram of an object file format.

FIG. 3 shows schematically an example of an object file format according to an embodiment of the present invention. In a preferred embodiment, each of the object modules 4 is compiled according to such an object format. According to such a format, an object module 4 typically comprises at least a header 22, compiled code 24, a relocation table 25, and symbols defined by a symbol table 26, string table 28, type section 30 and expression section 32.

The header 22 provides information on the module itself, such as the size and/or location of the different parts. The compiled code 24 is the actual program content that the compiler was able to compile from the individual module 2 before linking, and which has also been assembled into machine code by this stage.

The symbols provide information to the linker on aspects of the modules 2 such as global variables or procedure calls between modules that cannot be fully compiled by the compiler 12 when those modules are compiled individually. The symbols are listed in the symbol table 26. Each symbol may be associated with one or more corresponding strings in the string table 28. Further, according to the described embodiments, the symbols for use in deferred compilation checks and for use in analyzing the number of each resource required by a thread (referred to herein as "resource profiling") are defined by a reference in a corresponding field in either the type section 30 or the expression section 32, which will be discussed shortly.

The relocation table 25 contains a list of deferred modifications to apply to the code once the values of all symbols are resolved. A relocation table entry consists of an offset in the code, a reference to a symbol, and one or more integer constants indicating the type of relocation to apply. An example of a relocation action is to replace a range of bits at the given offset in the code with the value of the defined symbol.

Note that the diagram of FIG. 3 is highly schematised. It is not necessarily intended to show relative positions or sizes of the different parts in address space. Furthermore, as will be familiar to a person skilled in the art, the format may in fact comprise additional information to that shown such as debugging information like line numbers for use by a software developer in tracking down any errors that may occur in the linked program. However, for simplicity, only the parts of the format directly relevant to the described embodiments of the present invention are shown.

The following embodiments may perform two distinct kinds of check: checking for conflicts related to parallelism, which is achieved using the expression section 32; and type checking, which is achieved using the type section 30.

The type section 30 is for use in defining symbols for encoding the type of a global variable or procedure. The type of a global variable or procedure defined in one module can be declared (or prototyped) in one or more other modules, in which case all prototypes must agree with the definition. The prototype of a procedure specifies its name, the number and type of its arguments, and its return type. For example in C, "int f(int x, int y)" prototypes a procedure (or function) called f as returning an integer value and taking two integer arguments x and y.

To perform type-checking, when the compiler 12 compiles a source code module 2 which defines or prototypes a procedure, it includes a directive in the corresponding assembly file 3 telling the assembler to insert into the object file 4 a symbol and corresponding string indicative of that definition/prototype. For each symbol defined by the type section 30, the type section comprises a name field 26, which is an index referring to a field into the string table 28 giving the symbol's name, and a type field 38, which is an index referring to a field in the string table 28 giving a string indicative of the definition/prototype.

If two or more procedures from two separate modules attempt to prototype the same variable or procedure, the linker 14 can then compare the relevant strings to determine whether the prototyping is consistent. If a mismatch is found, this indicates a conflict and the linker 14 outputs an error message to the user. The user can then go back to modify the source code of one or more of the modules 2 to avoid the conflict, then recompile and link. Alternatively, where there is a conflict, the linker may be able to correct the conflict (referred to herein as "type coercion"). This is discussed in further detail below.

A conflict between prototypes is different from a conflict due to parallel execution of threads: it could occur between any modules of source code irrespective of multi-threading.

Symbols for use in checking for conflicts due to parallelism, and symbols for resource profiling and allocation, are defined by reference to a corresponding field in the expression section 32.

In one example, symbols can be inserted into the object modules 4 to check for conflicts between their corresponding threads in the use of a global variable. When the compiler 12 compiles a module 2 that contains an assignment to a global variable, it inserts a directive into the corresponding assembly file 3 which tells the assembler to insert into the object module 4 a symbol indicative of that fact. If another module 2 also assigns the global variable, the compiler 12 will do the same for that module. The compiler 12 also inserts directives that tell the assembler to insert symbols indicative of the parallelism of the procedures of those modules 2. At link time, the linker 14 can then detect from these symbols that two parallel threads might try to assign the same global variable at runtime, and output an error message to the user. The user can then go back to modify the source code of one or more of the modules 2 to avoid the conflict, then recompile and link.

Symbols can also be inserted to provide assertions. An assertion is an indication of a condition that must be true. The linker 14 can then test these assertions at link time once all symbols that the assertion depends on have been resolved. For example, this could be used to check for conflict due to a side effecting procedure which is called within a guard of a select statement and which illegally modifies a global variable (a side effect occurs where a procedure modifies some state of the program in addition to returning a value).

The expression section advantageously also enables a symbol to be defined as an expression to be evaluated at link time by the linker 13, including enabling a symbol of one object module to be defined as an operation on one or more other symbols from other object modules, i.e. with the one or more other symbols as operands. To achieve this, the expression section comprises a type field 40 for specifying the type of the expression, a result field 42 for storing a symbol number which denotes where the result of the expression will be stored, and three operand fields 44, 46 and 48 for storing operands of the expression.

For example, in the case of resource profiling, a symbol could be defined as the sum of the resources indicated by other symbols as being required by two or more parallel threads from different modules (e.g. number of ports 110, timers 112 or channel ends, or amount of memory). In this case, the linker 14 could use the symbols to evaluate at link time whether the total required resources for the threads exceeds a maximum limit for the target platform, e.g. exceeds the total resources available, and output an error message to the user. Alternatively a symbol could be defined as the sum of the total number of parallel threads indicated by other symbols as being contained within each of the modules, and the linker could evaluate whether that total number of threads to be executed in parallel exceeds a maximum and output an error message accordingly. The user can then go back to modify the source code of one or more of the modules 2 to avoid the conflict, then recompile and link.

Figure 4:
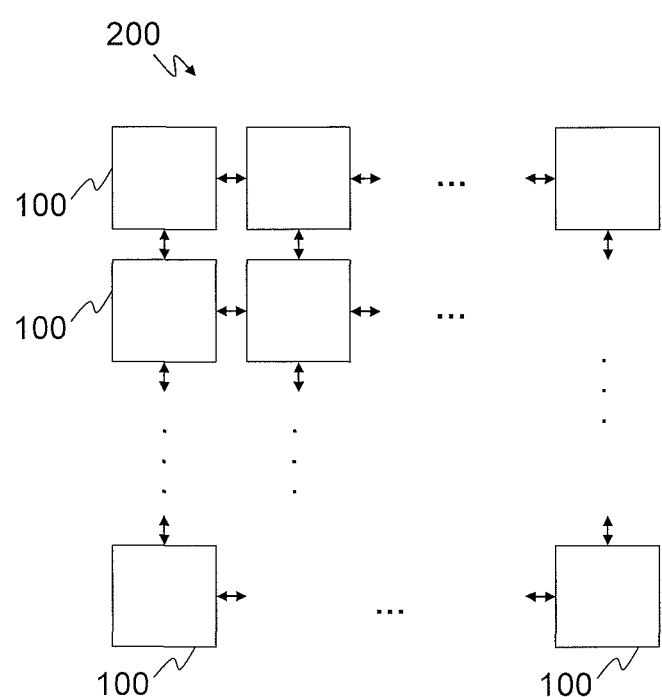
FIG. 4 is a schematic diagram of an interconnected processor array.

Alternatively or additionally, if the target processor is a multi-core arrangement 200 of two or more interconnected processors 100, as shown schematically in FIG. 4, then the linker 14 can use such symbols to automatically allocate the different threads to different processors 100. In such an arrangement, each processor 100 can run one or more threads and the threads on different processors 100 can communicate between one another. Thus, it need not matter from the programmer's point of view which processors 100 of the arrangement 200 are used to run which threads, and instead the linker can automatically determine this based on the available resources of each processor 100.

In another example, a symbol could also be defined to sum the stack requirements of parallel threads from different modules, for the purpose of stack allocation.

In a particularly advantageous embodiment, entries in the string table 28 can also be included to embed error messages in the object modules 4 for the linker 14 to output to the user if a conflict is detected by the linker 14. This is particularly useful because these strings are associated in the relevant object module 4 with the offending symbol, so the linker 14 just needs to look up the error string for that symbol upon detecting the conflict.

More detailed examples of these checks and profiling are given below, as is a more detailed example of the type section 30 and expression section 32. But first, an overall method according a preferred embodiment is described with reference to the flow chart of FIG. 5.

At step S2 the programmer programs the plurality N of source code modules 2(1) . . . 2(N), including explicitly specifying the required parallelism of the procedures of those modules in source code, i.e. explicitly designating procedures of those modules 2 as different threads. At step S4, the compiler 12 begins compiling the first source code module 2(1). At step S6, the compiler 12 (via assembler 13) generates the symbols for the deferred checking and/or resource allocation into the object module 4(1). At step S8, the compiler 12 (via assembler 13) outputs the corresponding object module 4(1). At step S10, the method branches depending on whether all N modules 2 have been compiled and assembled yet. If not, steps S2 to S8 are repeated for each successive module 2(2) . . . 2(N) until all corresponding object modules 4(2) . . . 4(N) have been output, including their respective symbols. The modules are compiled independently of one another, i.e. without the compiler 12 having any information about one while compiling another.

If all modules 2(1) . . . 2(N) have been compiled, the method proceeds to step S12 where the linker 14 begins the linking process, taking all of the compiled object modules 4(1) . . . 4(N) as an input. At step S16 the linker 14 assesses the relevant symbols to look for any conflict that might arise between parallel threads, e.g. semantic checks such as checking the use of global variables or checking for side effects. At step S18, the method branches depending on whether a conflict is found. If a conflict is found, the linker 14 outputs an error message, preferably obtained from the string table 28 by looking up the string associated with one or more of the offending symbols. The linking then halts and the programmer can then go back to step S2 to modify one or more of the source code modules to avoid the conflict, then repeat steps S4 to S16 to recompile and link. Alternatively, the linker may potentially be able to automatically resolve the conflict itself. Once no conflict remains, the method proceeds to step S20 where the linking of the modules 4(1) ... 4(N) is completed and the resulting executable program is output for execution on the target platform. The linking by the linker 14 at step S18 may include stack allocation, resource profiling and/or decisions as to which processors of a multi-core platform 200 to allocate the different threads to.

Figure 5:
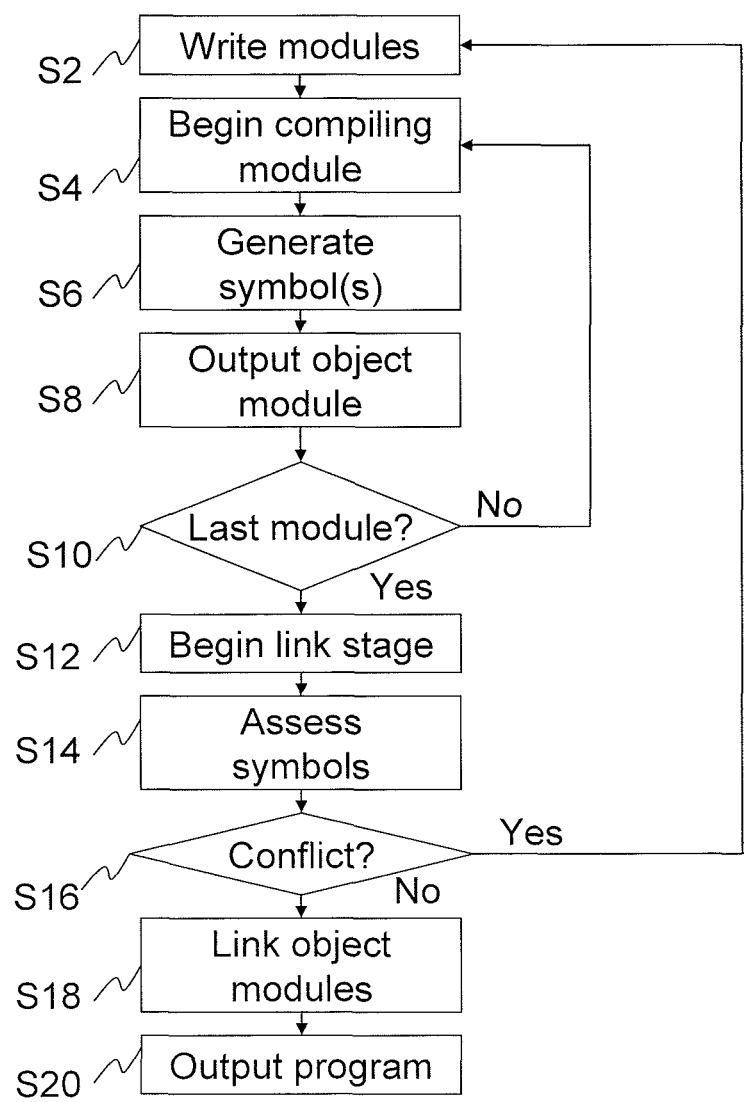
FIG. 5 is a flow chart of a method of compiling and linking.

The linker 14 may also have the ability to link a subset of the compiled objects, which changes the flow shown in FIG. 5 slightly. For example, it could link object modules 4(1) and 4(2) into a partially linked object module, then link that partially linked object module with a further object module 4(3).

A number of specific examples are now described in more detail. In each example, the top row shows the name of the file (or module) being compiled; the middle row shows the contents of the file, which is code written in the high-level language C, with the language extended with a "par{ ... }" statement to include explicit parallelism; and the bottom row shows directives (beginning with a ".") inserted into the assembly file 3 by the compiler 2, which cause the assembler to generate and insert a corresponding symbol into the object module 4 to provide information to the linker. The extended C or other high-level language may also provide features such as select statements.

The first example is of a deferred semantic check. The following program attempts to modify the value of global variable x in two threads in parallel. This is prohibited by the language, but without visibility of both files (or modules) the compiler is unable to spot the error.

| file1.xc | file2.xc |
|---|---|
| int x;<br>void f( );<br>void main( ) {<br>  par {<br>    x = 1;<br>    f( );<br>} }<br>.par thread.anon.0, f, "file1.xc:4: error:<br>%s used in more than one parallel statement"<br>.globwrite thread.anon.0, x,<br>  file1.xc:5: error: previously used here"<br>.call main, f<br>.call main, thread.anon.0 | extern int x;<br>void f( ) {<br>  x = 2;<br>}<br><br>.globwrite f, x,<br>  file2.xc:3: error:<br>previously used here" |

The first file contains a .par directive for telling the linker that a thread named thread.anon.0 is executed in parallel with a thread named f and that errors arising due to this are to be reported as "file1.xc:4: error: % s used in more than one parallel statement", where the linker is to substitute % s for the offending variable.

The .globwrite directive tells the linker that thread.anon.0 modifies the global variable x, and that errors arising due to this are to be reported as "file1.xc:5: error: previously used here."

The .call directives tell the linker that the procedure main calls the procedure f and the (pseudo) procedure thread.anon.0.

The second file contains a single .globwrite directive that tells the linker that f modifies the global variable x and that errors arising due to this are to be reported as "file2.xc:3: error: previously used here."

At link time, the linker has visibility of the symbols in both object modules and can determine that f, which writes the global variable x, is called in parallel with a thread that also writes x. This is an error and it prints the strings associated with the offending symbols:

file1.xc:4: error: x used in more than one parallel statement
file1.xc:5: error: previously used here
file2.xc:3: error: previously used here This is the same message that the compiler could have issued if both procedures were compiled together in the same module.

The second example is of another deferred semantic check. The following program attempts to cause a side effect within a guard of a select statement by modifying a global variable x in the called procedure f. This is prohibited by the language.

| file1.xc | file2.xc |
|---|---|
| int x;<br>int f( ) {<br>  return g( );<br>}<br>void main(chanend c1, chanend c2) {<br>  select {<br>    case f( ) enables input(c1, &x) :<br>      respond(x);<br>    case input(c2, &x) :<br>      respond(x);<br>  }<br>}<br>.linkset f.locnoside, 1<br>.linkset main.locnoside, 1<br>.call f, g<br>.assert 1, f.actnoside, "file1.xc:5:<br>error: guard makes call to side-<br>effecting function f" | int x;<br>int g( );<br>void g( ) {<br>  x += 1;<br>  return x;<br>}<br><br><br>.linkset g.locnoside, 0 |

The first file contains .linkset directives for telling the linker that the value of the symbols f.locnoside and main.locnoside are both 1. This indicates that the procedures f and main both contain no local side effects, which excludes side effects that could arise in procedures that these functions could call.

The .call directive tells the linker that the procedure f calls g. The .assert directive tells the linker to assert that the value of f.actnoside is 1, otherwise issue the error message: "file1.xc:5: error: guard makes call to side-effecting function f." The value of this symbol indicates whether or not the procedure f contains no side effects, both locally and in all of the functions that could be called due to f. Its value is generated by the linker using both the call graph (constructed from the .call directives) and locnoside values.

The second file contains a .linkset directive telling the linker that the value of g.locnoside is 0 (that the procedure g performs a side-effecting operation, in this case modifying the global variable x).

In this example, the linker determines that f causes a side effect as a result of a subsequent call to g, which performs a side effect, and prints the error message:

file1.xc:5: error: guard makes call to side-effecting function f

The third example is of deferred resource profiling. The following program consumes timer resources on a processor such as the processor 100 of FIG. 2.

| file1.xc | file2.xc |
|---|---|
| void main( ) { <br>   f1( ); <br>   par { <br>     f2( ); <br>     f3( ); <br>   } <br> } <br> .linkset LNK1, max(f2.maxtimers, f3.maxtimers) <br> .linkset main.maxtimers, f1.maxtimers + LNK1 | void f1( ) { <br>   timer t; <br>   input(t, &now); <br> } <br> //f2 and f3 similarly <br><br> .linkset f1.maxtimers, 1 |

In the first file, the first .linkset directive tells the linker that the value of symbol LNK1 is the maximum of the values of the symbols f2.maxtimers and f3.maxtimers. The second directive tells the linker that the value of main.maxtimers is the sum of f1.maxtimers and LNK1. This represents the maximum number of timers that could be allocated during the lifetime of f. The resource usage symbols for the processor 100 are:

| Name | Description |
|---|---|
| func.maxtimers | Maximum number of timers allocated at any one time |
| func.maxthreads | Maximum number of threads used at any one time |
| func.maxchanends | Maximum number of channel ends allocated at any one time |
| func.nstackwords | Maximum amount of memory in words used by the stack at any one time |

If a procedure itself calls other procedures then the compiler can express these resource symbols in terms the resource symbols of the called procedures. If two procedures are called in sequence, the resource symbol for that procedure is set to maximum of the resource symbols of the called procedures. If two procedures are called in parallel, the resource symbol for that procedure is set to the sum of the resource symbols of the called procedures. If a procedure calls a number of procedures in sequence and a number in parallel then the resource symbol for the caller will be set using a combination of maximums and sums of the resource symbols of the called procedures.

The resource usage symbols for the entry point of the program (for example, main) give an upper bound on the maximum number of resources that will be needed during execution of the program. If this is less than the number of hardware resources available in the target processor then the linker can guarantee that the program will not fail at runtime due to a lack of available hardware resources, otherwise it can warn that it might fail. In one implementation, a file written using the Extensible Markup Language (XML) could be used to describe the target system in terms of its number of cores, amount of memory and number of resources. This information can also be used for thread-to-core allocation.

The fourth example is of deferred stack allocation. The following program creates two threads: the parent executes f, another thread executes g and another thread executes h.

| file1.xc |
|---|
| void main( ) { <br>   par { <br>     f( ); // parent <br>     g( ); // thread that calls g <br>     h( ); // thread that calls h <br>   } <br> } <br> main: <br>     some assembly code <br> .linkset LLNK0, f.nstackwords + g.nstackwords <br> .linkset LLNK1, LLNK0 + 1 <br> L1:   # Thread that calls h <br>     extsp LLNK1     # branch over space for f, g and alloc 1 slot <br>     bl   h <br>     ssync <br> .linkset LLNK2, f.nstackwords + 1 <br> .linkset LLNK3, LLNK2 + g.nstackwords <br> .linkset LLNK4, LLNK3 + h.nstackwords <br> .linkset main.nstackwords, LLNK4 + 5 |

This example assumes that the compiler does not know the stack requirements for f, g or h as they are not defined in the file (f, g and h are defined in other files not shown here). It also assumes that the stack pointer for each thread is initialized to the stack pointer of its parent. It also assumes that the compiler arranges the workspaces for the two threads immediately after the parent in lexical order. Finally, it assumes that the workspace requirement for the thread that calls h is 1 slot.

The object module compiled from this file will get definitions for f.nstackwords from another object. Similarly, the object module compiled from this file will define main.nstackwords (required by any other object module that contains a call to main).

The first .linkset directive tells the linker that the value of symbol LLNK0 is the sum of the values of the symbols f.nstackwords and g.nstackwords. The second .linkset directive tells the linker that the value of LLNK1 is the sum of LLNK0 and 1.

The code at label L1 is executed on the second created thread. The workspace for h is allocated by extending the stack by the value of the symbol LLNK1. At link time, when the size of f and g are known (defined in other objects) then the linker is able to evaluate the value of LLNK1 and apply a relocation to the extsp instruction. Any stack accesses across workspaces (for example, when one thread reads the value of a read-only variable defined in its parent) are also implemented using this technique.

Note that this example also shows the compiler-deferred computations used to generate the stack size of main, which is the sum of the stack sizes of f, g, h and 5.

Not also that an expression symbol can refer to a value or stack offset (e.g. in the example above EXTSP is a symbol that is resolved once all stack sizes are known). This is different from other resource profiling in that it's not just the total size but the location of variables on the stack which are important.

An example of link-time type checking is now given. A procedure prototype is a different potential conflict from a conflict arising due to parallelism, and arises irrespective of multi-threading. The following program is illegal because a declaration of f in the first file is different from the declaration of f in the second.

| file1.xc | file2.xc |
|---|---|
| int func(int);<br>void main( ) {<br>  int sum = func(x);<br>}<br>.extern func, "f{si}(si)" | int func(int x, int y) {<br>  return x + y;<br>}<br><br>.globl func, "f{si}(si,si)" |

In the first file the .extern (prototype) directive tells the linker that the type associated with the symbol func is the string "f{si}(si)".

In the second file the .globl (definition) directive tells the linker that the type associated with the symbol func is the string "f{si}(si,si)".

The linker determines that there are two symbol declarations for func in the two compiled modules, and that the strings associated with these symbols do not match. It decodes the strings and prints the conflicting types as an error.

The following program is legal because the incomplete prototype of x in the first file is completed by its definition in the second file. The wildchar (*) character is treated specially for the purpose of comparison.

| file1.xc | file2.xc |
|---|---|
| extern int x[ ];<br>.extern x, "a(*:si)" | int x[10];<br>.globl x, "a(10:si)" |

The linker determines that these two type strings are compatible, as 10 is a valid substitution for the wildchar character.

An example of link-time type coercion is now discussed, following on from type-checking. As mentioned above, the present invention may compile from a high-level source code language which may be an extension of an existing language such as C. This extended language will preferably be made "safe" to prevent certain errors, where standard C will not be.

One such safety feature may be that array parameters in the extended C language with unknown size have an implicit bound that a procedure caller passes to a callee. The callee uses this variable when determining whether array accesses are valid. For example, void func(int a[ ], int x);

In standard C a call to this procedure is required to pass two values: the address of the base of a, and x. In the extended safe C a call to this procedure is required to pass three values: the address of the base of a, x and the upper bound of a.

This procedure may be prototyped in a header file and called by both standard C and extended C procedures (or functions). A standard C compiler will assume that it needs to provide two values, and a compiler of the extended C will assume that it needs to provide three values. The linker applies techniques to ensure that whatever the actual type of the function (as provided by the type string) it can be called from any standard C or extended C function.

If the function is compiled in standard C and called from the extended C then the linker patches the caller to call a coercer function that receives but ignores the additional bound values. If the function is compiled in the extended C and called from standard C then the linker patches the caller to call a coercer function that calls func with the additional bound value. Unknown bound values are set to the largest representable number, thus ensuring that the function will not fail due to an array bounds check (although it might fail if the array element addressed does not exist).

If in the below example the function func is compiled in the extended C and called from a function main that is compiled in standard C then in one implementation the coercer function modifies the stack parameters as illustrated below. In this example it is assumed that all parameter values are passed on the stack. Note that the normal calling convention for the XCore optimizes passing of the first four parameters in registers, with any subsequent parameters being passed on the stack.

| File containing main | Coercer function | File containing func |
|---|---|---|
| void func (int a[ ],<br>          int x);<br>void main(void) {<br>  int a[10];<br>  int x;<br>  func(a, x);<br>  return;<br>} | Auto-generated<br>(see below) | void func (int a[ ],<br>          int x) {<br>  int y[4];<br>  ...<br>  return;<br>} |
| Stack layout of main | Stack layout of coercer | Stack layout of func |
|     3  workspace<br>    2  outarg2    x<br>    1  outarg1    &a[0]<br>SP 0  reserved |     5  workspace<br>    4  saved lr<br>    3  outarg3    MAX<br>    2  outarg2    x<br>    1  outarg1    &a[0]<br>SP 0  reserved |     10  workspace<br>    9  saved lr<br>    8  outarg3    MAX<br>    7  outarg2    x<br>    6  outarg1    &a[0]<br>    5  reserved<br>    1  workspace<br>SP 0  reserved |
| Assembly for main | Assembly for coercer | Assembly for func |
| main:<br>  entsp   10<br>  stw     sp[1], &a[0]<br>  stw     sp[2], x<br>  bl      func.coerce<br>  retsp   10 | func.coerce:<br>  extsp  2<br>  ldw    r0, sp[3]<br>  stw    r0, sp[1]<br>  ldw    r0, sp[4]<br>  stw    r0, sp[2]<br>  ldc    r0, MAX | func:<br>  unchanged<br>  (entsp 5) |

-continued

```
stw    r0, sp[3]
stw    lr, sp[4]
bl     func
ldw    lr, sp[4]
ldaw   sp, sp[2]
retsp  0
```

In the coercer, two additional words of storage are required on the stack to store the return address passed in the link register (lr) and to store the additional bound parameter expected by the callee but not passed by the caller. The coercer extends the stack by two words. The parameters passed by the caller are moved to the stack positions in which the callee expects them to appear. The largest representable number (MAX) is stored to the stack position in which the callee expects the bound parameter. The coercer then calls the callee. When the callee returns, the coercer restores the value of the stack pointer (sp) to the value it had when the coercer was called, and then returns to the caller.

A more general application of this scheme is to allow standard C types to coerce with extended C types specific to a certain processor architecture such as ports 110, channels, clocks and timers 112 (for example, to allow a port to pass through a C function), all of which are implemented using integers on the XCore.

Consider the following prototypes:

| | |
|---|---|
| typedef int port; | //standard c |
| void f(port p); | //standard c |
| void f(port p); | //extended c |

During linkage a type string mismatch occurs (due to the port/int parameters). The linker could then choose to treat these types as compatible and permit the linkage (without the need for coercion).

The following is an example of the expression Section 32. The object file 4 contains an expression section (using an extensible object format such as ELF or COFF) that is used to store a block of expressions which include a symbol, an opcode and three operands of type integer constant, string or symbol. This section facilitates the computation of values at link time by allowing symbol values to be defined as arbitrary arithmetic expressions containing constant, strings (from the string table) and symbol values. In particular, a symbol in one object module can contain references to symbols in other object modules.

The expression section contains a set of structures of the format:

```
typedef struct {
    Word type;
    Word result;
    Word op1;
    Word op2;
    Word op3;
} Expr;
```

If an Expr describes an arithmetic operation then the result field is a symbol number which denotes where the result will be stored. The type field determines the arithmetic operation and whether each of the three operands is a constant value or an index into the symbol table as described in the table below. If the type is not arithmetic then it describes a relationship between the target and the three operands.

| Bits | Value | Description |
|---|---|---|
| 0-1 | 0 | Operand <1> is a constant |
|  | 1 | Operand <1> is a symbol index |
|  | 2 | Operand <1> is a string index |
| 2-3 | 0 | Operand <2> is a constant |
|  | 1 | Operand <2> is a symbol index |
|  | 2 | Operand <2> is a constant |
| 4-5 | 0 | Operand <3> is a string index |
|  | 1 | Operand <3> is a symbol index |
|  | 2 | Operand <3> is a string index |
| 6-14 | 0 | Operand is NULL (unused) |
|  | 1 | Returns sum of <1> and <2> |
|  | 2 | Returns max of <1> and <2> |
|  | 3 | Returns product of <1> and <2> |
|  | 4 | Returns <1>-<2> |
|  | 5 | If <2> evaluates to 0 then print string <1> as an error |
|  | 6 | Returns the value of <1> aligned to size <2> |
|  | 7 | Returns a boolean value for <1> < <2> |
|  | 8 | Returns a boolean value for <1> > <2> |
|  | 9 | Returns a boolean value for <1> <= <2> |
|  | 10 | Returns a boolean value for <1> > = <2> |
|  | 11 | Unused |
|  | 12 | Denotes that procedure calls procedure <1> |
|  | 13 | Denotes that procedure passes a reference to global <1>; <2> is a string which identifies a source line |
|  | 14 | Denotes that procedure takes a reference to global <1>; <2> is a string which identifies a source line |
|  | 15 | Denotes that procedure reads global <1>; <2> is a string which identifies a source line |

| Bits | Value | Description |
|---|---|---|
| | 16 | Denotes that procedure writes global <1>; <2> is a string which identifies a source line |
| | 17 | Denotes that symbol <1> contains the stack usage of procedure |
| | 18 | Unused |
| | 19 | Denotes that symbol <1> contains the thread usage of procedure |
| | 20 | Denotes that symbol <1> contains the timer usage of procedure |
| | 21 | Denotes that symbol <1> contains the channel end usage of procedure |
| | 22 | Unused |
| | 23 | <1> is a boolean value which is non-zero if procedure and its callees have no side effects |
| | 24 | <1> is a boolean value which is non-zegro if procedure (but not necessarily its callees) have no side effects |
| | 25 | Procedures and <1> may be called in parallel; <2> is a string which identifies a source line |
| | 26 | Unused |
| | 27 | Denotes that the user-visible name of symbol should be string <2> |

A symbol used as an operand can itself be the result of an expression. The linker applies a recursive algorithm to compute the final values for all symbols. Any cycles in the reference graph are detected and are either reported as errors (for example, recursion in a program making computation of stack space impossible) or result in default values being used (for example, assuming that a procedure uses one thread unless otherwise specified).

It is possible to link multiple object modules that do not comprise an entire program. In this case, as many symbol references as possible are resolved, with any redundant expressions and their associated intermediate symbols being eliminated from the resulting object module. In the final executable, all symbols relating to semantic checks and resource allocation are eliminated and therefore do not contribute to its size.

The following is an example of the type section 30. Type checking information is inserted into a section that contains a set of structures of the format:

```
typedef struct {
    Word symbol;
    Word type;
} TypeInfo;
```

The symbol member is an index into the object's string table which contains the character representation of the symbol name. The type member is an index into the object file's string table which holds the character representation of the type string. If there is no type string associated with a symbol then there is no entry in the table. Two typeinfo table entries are compared for compatibility as previously described.

It will be appreciated that the above embodiments are described only by way of example. For instance, although in certain kinds of object format the term "symbol" may have a particular meaning, the symbols of the present invention could in general be any information inserted into the object format for use in checking for conflict at the linking stage. Further, the invention could apply to any kind of object format. Further, the invention could be applied to any kind of target platform. Further, although the parallelism has been described as being explicit in the source code, it could alternatively be specified by the user controlling the compiler, an initial stage of the linker, or another tool of the tool-chain to allocate which procedures are to be executed as parallel threads. In either case, the parallelism is explicit in that it is allocated by a user, rather than being allocated automatically by the compiler, linker or other tool such as in an automated optimisation process. The invention is not limited to the parallelism being specified at any particular stage (as long as before the actual linking). Note also that where the parallelism is explicit in the source code, it need not be specified in every source code module (e.g. in the above examples the "par" statement is only needed in one of the source code modules), but nor is the possibility of specifying the parallelism in every source code module excluded. Further, note that the "procedure" is intended as a broad term, and can refer to any portion of code for performing any action, operation or the like. Other applications and configurations may be apparent to the person skilled in the art given the disclosure herein. The scope of the invention is not limited by the described embodiments, but only by the following claims.

The invention claimed is:

1. A method comprising:
   independently compiling a plurality of modules of source code to generate a plurality of respective object modules comprising machine code and symbols other than machine code for providing information to a linker, different ones of the object modules comprising different respective parallel threads explicitly designated by a user to be executed in parallel on a target platform, and the target platform comprising an arrangement of interconnected processors;
   in each of the object modules, inserting at least one of said symbols to indicate a usage of a resource of the target platform associated with the respective thread;
   executing the linker to perform a linking process for linking the object modules, wherein the linking process comprises assessing the symbols in conjunction with one another to determine an allocation of the threads to different processors of the arrangement in dependence on the threads' associated resource usage, and based on the assessment generating an indication relating to a usage of the resource required for execution of said threads in parallel, said indication comprising an indication of said allocation;
   wherein the linking process further comprises linking the object modules using said indication to generate a computer program in which said threads are to be executed in parallel on the allocated processors.

2. The method of claim 1, wherein said assessment comprises determining whether a total of the resource usage required by the threads exceeds a maximum limit, said indication comprising an indication of whether the total resource usage exceeds said maximum limit.

3. The method of claim 2, wherein the method comprises halting the linking process on condition that said indication indicates that the total of the resource usage does exceed the maximum limit.

4. The method of claim 2, wherein said generation of the indication comprises generating an error message to a user.

5. The method of claim 2, wherein the method comprises, on condition that said indication indicates that the total of the resource usage does exceed the maximum limit:
- modifying one or more of the modules of source code to avoid the exceeding of the maximum limit;
- re-compiling the one or more modules of source code to re-generate the object modules; and
- following the modification and re-compilation, re-executing the linker to link the object modules to generate a computer program in which said threads are to be executed in parallel.

6. The method of claim 2, wherein the maximum limit is the total available of the resource on the target platform.

7. The method of claim 1, wherein said insertion of a symbol indicative of a resource usage in each object module comprises inserting a symbol indicative of an amount of memory required by the respective thread, said indication comprising an indication relating to a memory usage required for execution of said threads in parallel.

8. The method of claim 1, wherein said insertion of a symbol indicative of a resource usage in each object module comprises inserting a symbol indicative of the number of ports required by the respective thread, said indication comprising an indication relating to a usage of ports required for execution of said threads in parallel.

9. The method of claim 1, wherein said insertion of a symbol indicative of a resource usage in each object module comprises inserting a symbol indicative of the number of timers required by the respective thread, said indication comprising an indication relating to a usage of timers required for execution of said threads in parallel.

10. The method of claim 1, wherein said insertion of a symbol indicative of a resource usage in each object module comprises inserting a symbol indicative of a number of channel ends required by the respective thread, the channel ends being a resource of the target platform for communicating between threads, and said indication comprising an indication relating to a usage of channel ends required for execution of said threads in parallel.

11. The method of claim 1, wherein said insertion of a symbol indicative of a resource usage in each object module comprises inserting a symbol indicative of a number of parallel threads of other object modules whose execution is to be initiated by a procedure of the respective thread, and said indication comprising an indication of a number of threads required to be executed in parallel as a result of that procedure.

12. The method of claim 1, wherein said assessment comprises determining an allocation of an amount of the resource for execution of the threads in parallel, said indication comprising an indication of the allocated amount; and
- the linking process comprises linking the object modules using said indication to generate a computer program in which said threads are to be executed in parallel using the allocated amount of the resource.

13. The method of claim 12, wherein said insertion of a symbol indicative of a resource usage in each object module comprises inserting a symbol indicative of a stack requirement for the respective thread, said indication comprising an indication relating to a stack allocation for execution of said threads in parallel.

14. The method of claim 13, wherein the stack allocation comprises a stack size.

15. The method of claim 13, wherein the stack allocation comprises a stack offset.

16. The method of claim 1, wherein:
- said insertion of a symbol in at least one of the object modules comprises defining that symbol as an expression by including in the object module an indication of an operation and at least one operand; and
- said assessment comprises evaluating the expression to determine the resource usage required by execution of the threads in parallel.

17. The method of claim 16, wherein one or more of said operands comprises an indication of another symbol of another object module, thus defining the symbol as a function of those one or more other symbols.

18. The method of claim 17, wherein the expression comprises an expression to determine the sum of the resources required by the parallel threads.

19. The method of claim 17, wherein the expression comprises an expression to determine the maximum of the resources required by two or more of the respective threads.

20. The method of claim 2, wherein the method comprises:
- in at least one of the object modules, inserting an error message associated with the respective symbol; and
- outputting the error message to a user on the condition of finding that the total usage exceeds said maximum limit.

21. The method of claim 20, wherein the error message is inserted as a string associated with the respective symbol.

22. The method of claim 1, wherein the threads are explicitly designated in one or more of the source code modules to be executed in parallel.

23. The method of claim 1, wherein each of said threads comprises at least one procedure and at least one of said threads comprises a plurality of procedures, wherein said insertion of a symbol in each object module indicative of a resource usage required by the respective thread comprises inserting a symbol indicative of a resource usage required by a procedure of the respective thread, and said assessment comprises determining whether the total resource usage required by parallel execution of procedures exceeds a maximum limit.

24. A tool-chain comprising code embodied on a non-transitory computer-readable storage medium, the code comprising:
- first code for individually compiling and assembling a plurality of modules of source code into respective object modules comprising machine code and symbols other than machine code for providing information for linking, different ones of the object modules comprising different respective parallel threads explicitly designated by a user to be executed in parallel on a target platform, and the target platform comprising an arrangement of interconnected processors, wherein the first code comprises code which when executed on a computer will insert in each of the object modules at least one of said symbols to indicate a usage of a resource of the target platform associated with the respective thread; and
- second code for linking the object modules, the second code comprising code which when executed on a computer will assess the symbols in conjunction with one another to determine an allocation of the threads to different processors of the arrangement in dependence on the threads' associated resource usage, and based on the assessment generate an indication relating to a usage of the resource required by execution of said threads in parallel, said indication comprising an indication of said allocation;

wherein the second code is configured to link the object modules using said indication to generate a computer program in which said threads are to be executed in parallel on the allocated processors.

25. The tool-chain of claim 24, wherein said assessment comprises determining whether a total of the resource usage required by the threads exceeds a maximum limit, said indication comprising an indication of whether the total resource usage exceeds said maximum limit.

26. The tool-chain of claim 25, wherein the second code comprises code which when executed on a computer will halt the linking process on condition that said indication indicates that the total of the resource usage does exceed the maximum limit.

27. The tool-chain of claim 25, wherein said generation of the indication comprises generating an error message to a user.

28. The tool-chain of claim 25, wherein the second code comprises code for, on condition that said indication indicates that the total of the resource usage does exceed the maximum limit:
following modification of one or more of the modules of source code to avoid the exceeding of the maximum limit and re-compilation of the one or more modules of source code to re-generate the object modules, linking the object modules to generate a computer program in which said threads are to be executed in parallel.

29. The tool-chain of claim 25, wherein the maximum limit is the total available of the resource on the target platform.

30. The tool-chain of claim 24, wherein said insertion of a symbol indicative of a resource usage in each object module comprises inserting a symbol indicative of an amount of memory required by the respective thread, said indication comprising an indication relating to a memory usage required for execution of said threads in parallel.

31. The tool-chain of claim 24, wherein said insertion of a symbol indicative of a resource usage in each object module comprises inserting a symbol indicative of the number of ports required by the respective thread, said indication comprising an indication relating to a usage of ports required for execution of said threads in parallel.

32. The tool-chain of claim 24, wherein said insertion of a symbol indicative of a resource usage in each object module comprises inserting a symbol indicative of the number of timers required by the respective thread, said indication comprising an indication relating to a usage of timers required for execution of said threads in parallel.

33. The tool-chain of claim 24, wherein said insertion of a symbol indicative of a resource usage in each object module comprises inserting a symbol indicative of a number of channel ends required by the respective thread, the channel ends being a resource of the target platform for communicating between threads, and said indication comprising an indication relating to a usage of channel ends required for execution of said threads in parallel.

34. The tool-chain of claim 24, wherein said insertion of a symbol indicative of a resource usage in each object module comprises inserting a symbol indicative of a number of parallel threads of other object modules whose execution is to be initiated by a procedure of the respective thread, and said indication comprising an indication of a number of threads required to be executed in parallel as a result of that procedure.

35. The tool-chain of claim 24, wherein said assessment comprises determining an allocation of an amount of the resource for execution of the threads in parallel, said indication comprising an indication of the allocated amount; and
the second code comprises code which when executed on a computer will link the object modules using said indication to generate a computer program in which said threads are to be executed in parallel using the allocated amount of the resource.

36. The tool-chain of claim 35, wherein said insertion of a symbol indicative of a resource usage in each object module comprises inserting a symbol indicative of a stack requirement for the respective thread, said indication comprising an indication relating to a stack allocation for execution of said threads in parallel.

37. The tool-chain of claim 36, wherein the stack allocation comprises a stack size.

38. The tool-chain of claim 36, wherein the stack allocation comprises a stack offset.

39. The tool-chain of claim 24, wherein:
said insertion of a symbol in at least one of the object modules comprises defining that symbol as an expression by including in the object module an indication of an operation and at least one operand; and
said assessment comprises evaluating the expression to determine the resource usage required by execution of the threads in parallel.

40. The tool-chain of claim 39, wherein one or more of said operands comprises an indication of another symbol of another object module, thus defining the symbol as a function of those one or more other symbols.

41. The tool-chain of claim 40, wherein the expression comprises an expression to determine the sum of the resources required by the parallel threads.

42. The tool-chain of claim 40, wherein the expression comprises an expression to determine the maximum of the resources required by two or more of the respective threads.

43. The tool-chain of claim 25, wherein:
the first code comprises code which when executed on a computer will insert an error message associated with the respective symbol in at least one of the object modules; and
the second code comprises code which when executed on a computer will output the error message to a user on the condition of finding that the total usage exceeds said maximum limit.

44. The tool-chain of claim 43, wherein the error message is inserted as a string associated with the respective symbol.

45. The tool-chain of claim 24, wherein the threads are explicitly designated in one or more of the source code modules to be executed in parallel.

46. The tool-chain of claim 24, wherein each of said threads comprises at least one procedure and at least one of said threads comprises a plurality of procedures, wherein said insertion of a symbol in each object module indicative of a resource usage required by the respective thread comprises inserting a symbol indicative of a resource usage required by a procedure of the respective thread, and said assessment comprises determining whether the total resource usage required by parallel execution of procedures exceeds a maximum limit.

47. A compiler and assembler product for individually compiling and assembling a plurality of modules of source code, wherein the compiler and assembler product comprises code embodied on a non-transitory computer-readable storage medium which when executed on a computer performs steps of:

independently generating a plurality of respective object modules from each of the modules of source code, the object modules comprising machine code and symbols other than machine code for providing information to a linker, different ones of the object modules comprising different respective threads explicitly designated by a user to be executed in parallel on a target platform, and the target platform comprising an arrangement of interconnected processors; and in the compilation of each object modules, inserting at least one of said symbols to indicate a usage of a resource of the target platform associated with the respective thread, for use by the linker to determine an allocation of the threads to different processors of the arrangement in dependence on the threads' associated resource usage and thereby link the object modules using said indication to generate a computer program in which said threads are to be executed in parallel on the allocated processors.

48. A linker for linking a plurality of independently compiled object modules, the object modules comprising machine code and additional symbols other than machine code for providing information to the linker, different ones of the object modules comprising different respective threads explicitly designated by a user to be executed in parallel on a target platform, and the target platform comprising an arrangement of interconnected processors, each object module comprising at least one of said symbols being indicative of a usage of a resource of the target platform associated with the respective thread; wherein the linker comprises code embodied on a non-transitory computer-readable storage medium which when executed on a computer performs steps of:

assessing the symbols in conjunction with one another to determine an allocation of the threads to different processors of the arrangement in dependence on the threads' associated resource usage, and based on the assessment generating an indication relating to a usage of the resource required by execution of said threads in parallel, said indication comprising an indication of said allocation; and linking the object modules using said indication to generate a computer program in which said threads are to be executed in parallel on the allocated processors.

* * * * *